Figure 1:
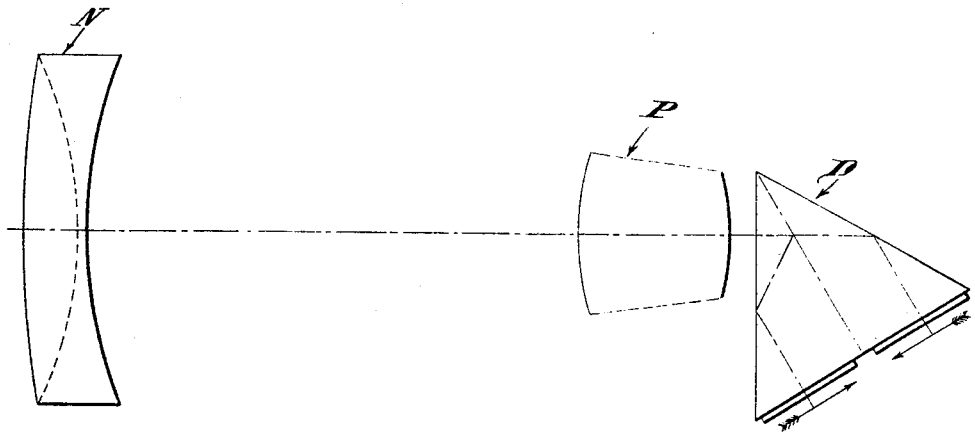

Patented June 14, 1932

1,862,950

UNITED STATES PATENT OFFICE

JOSEPH A. BALL, OF LOS ANGELES, CALIFORNIA, ASSIGNOR TO TECHNICOLOR MOTION PICTURE CORPORATION, OF BOSTON, MASSACHUSETTS, A CORPORATION OF MAINE

OPTICAL APPARATUS

Application filed June 17, 1929. Serial No. 371,412.

In certain branches of the art of photography requiring the use of short focus lenses, it is highly desirable to obtain more space between the lens and the focal plane than such lenses afford. For example, in color cinematographic cameras using prism sets for dividing the image-bearing beam into component beams with which to obtain simultaneous images representing different color aspects of the object-field, considerable space must be available for the prism set between the objective lens and the film to be exposed.

Objects of the present invention are to increase the aforesaid spacing between objective and focal plane and preferably at the same time to decrease the equivalent focal length so as to increase the depth of focus at large apertures, and to provide means for this purpose which not only avoids serious distortion but also tends to counteract the aberrations introduced by the prism set such as curvature of field.

In one aspect the invention involves the use of a positive lens and a negative lens constructed and arranged in front of the positive lens to increase the back focal length, the distance between the two lenses being at least of the order of the focal length of the positive lens and the negative lens preferably being meniscus in form.

In another aspect the invention involves the use of a dispersive or negative lens located in front of the usual collecting or positive objective at a distance sufficient to reduce the equivalent focal length of the combination relatively to that of the objective lens alone. This distance should be somewhat greater than the focal length of the objective alone, as shown by the following formulæ in which $f$ is the equivalent focal length of the combination, $f'$ the focal length of the positive lens, $f''$ the focal length (virtual) of the negative lens, and D the distance between the two lenses:

$$\frac{1}{f} = \frac{1}{f'} + \frac{1}{f''} - \frac{D}{f'f''} \text{ or } \frac{1}{f} = \frac{1}{f'} - \frac{1}{f''} + \frac{D}{f'f''}$$

Thus if D is less than $f'$ $f$ is less than $f'$; when D equals $f'$, $f$ also equals $f'$; and when D is greater than $f'$, $f$ is less than $f'$.

In another aspect the invention involves a prism set or other light-dividing means, intermediate the positive lens and the focal plane of the lens, having dimensions greater than can be accommodated to the back focal length of the objective lens alone, and a negative lens disposed in front of the objective, the dispersive power of the negative lens and its spacing from the objective lens being sufficient to decrease the equivalent focal length of the lens system while increasing the back focal length sufficiently to accommodate the prism set.

In still another aspect the invention is characterized by using, as the aforesaid dispersive or negative lens, a meniscus lens having its concave side facing the objective lens, thereby minimizing distortion, particularly of the so-called barrel-shaped type. The ratio of curvature of the concave and convex faces of the meniscus lenses should be of the order of two to one.

Other aspects of the invention relate to a positive-negative lens combination of relatively short equivalent focal length with which, if desired, there may be combined a prism or other means for reflecting the light beam which passes through the lens combination.

Figure 2:
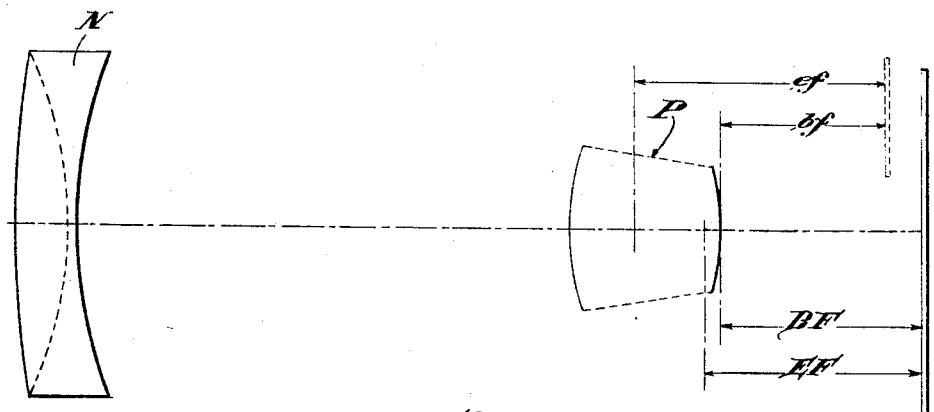

For the purpose of illustrating the invention a typical embodiment is shown diagrammatically in the accompanying drawing in which:

Fig. 1 represents the entire system; and
Fig. 2 shows the lenses without the prisms.

In the drawing, D represents a light-dividing prism set and P and N the positive and negative lenses. While the illustrated light-dividing means is of the type disclosed in the patent to Comstock, No. 1,497,357, it will be understood that other types may be used according to this invention; likewise that various designs of positive and negative lenses may be used.

However, a typical combination of lenses for color cinematographic cameras comprises a fifty millimeter objective with a minus-six plus-three meniscus positioned with its concave side toward the objective at a distance from the objective of approximately four and one-half inches. With this combination the equivalent or resultant focal length is forty-three millimeters and the back focal length is forty millimeters, whereas the back focal length of the objective alone is only thirty-three millimeters. Likewise with a forty millimeter objective such a meniscus would afford a resultant focal length of thirty-two millimeters, while affording enough space for a prism set such as illustrated—which would not be available without the meniscus.

In the illustrated embodiment, which is particularly suitable for cinematographic cameras, the meniscus lens N has a diameter of two and five-eighths inches, its concave and convex faces have curvatures of plus three and minus six diopters respectively, it is chromatically corrected, and it is spaced four and one-half inches from the lens P measured between lines tangent to the concave front faces of the two lenses respectively. Inasmuch as the construction of the positive lens is not novel and may be varied widely, only the front and rear faces are shown in the drawing, the peripheries of these faces being connected by broken lines to indicate an intermediate construction of any suitable composite lens type. The distance between the front and rear faces of this composite lens, measured from lines tangent to the faces respectively is one and six-thirty seconds inches. The front and rear apertures may be one inch and three-quarters of an inch respectively. As shown in Fig. 2, the back focal length of the entire system (BF) is forty millimeters and the equivalent focal length of the system (EF) is forty-three millimeters, whereas the back focal length and the equivalent focal length of the positive lens P alone (*bf* and *ef*) are thirty-three and fifty millimeters respectively. Thus the addition of the meniscus increases the back focal length seven millimeters and decreases the equivalent focal length an equivalent amount.

A secondary feature of the invention consists in that the meniscus lens counteracts the tendency of the prism set to introduce aberrations, particularly curvature of field, thereby simplifying the correction of the optical system as disclosed for example in the patent to Comstock, Re. No. 14,983.

In the appended claims, the term "assembly" qualified by either of the words "positive" or "negative", as the case may be, shall be understood as generically comprehending a single lens, a single doublet or other plural lens arrangement, a plurality of doublets or a plurality of other plural lens arrangements, a plurality of single lenses, or a combination consisting of a single lens and a doublet or other plural lens arrangement. It shall also be understood that the term "assemblies" shall have a corresponding meaning.

In the appended claims, the expression "picture aperture" refers generically to the usual rectangular gate or frame with which successive sections of the motion picture film, or equivalent, are registrable. In case this gate or frame is not utilized, the expression above noted shall be understood as defining the effective field covered by my novel lens system.

I claim:

1. A photographic lens system adapted to be used with a picture aperture and comprising a positive lens, light-dividing means intermediate the positive lens and the focal plane of the lens, and a negative lens in front of the positive lens, said lenses being spaced apart a distance greater than the focal length of the positive lens to thereby decrease the equivalent focal length of the system as compared with the positive lens alone, without a similar decrease in the back focal length of the system as compared with positive lens alone, said lens system having an equivalent focal length no greater than twice the length of the longest side of the picture aperture.

2. A photographic lens system adapted to to be used with a picture aperture and comprising a positive lens, light-dividing means intermediate the positive lens and the focal plane of the lens and having dimensions greater than can be accommodated to the back focal length of the positive lens, and a negative meniscus lens in front of the positive lens, the power of the negative lens being less than that of the positive lens and its spacing from the objective lens being greater than the focal length of the positive lens, so as to decrease the equivalent focal length of the system without correspondingly decreasing the back focal length, said lens system having an equivalent focal length no greater than twice the length of the longest side of the picture aperture.

3. A photographic lens system adapted to be used with a plurality of picture apertures for producing a plurality of corrected images, said lens system comprising a collecting lens and a dispersing lens spaced a distance greater than the focal length of the collecting lens, and light-dividing means between the collecting lens and the image plane said lens system having an equivalent focal length no greater than twice the length of the longest side of the picture aperture.

4. A photographic lens system adapted to be used with a picture aperture and comprising a positive lens, light-dividing prisms intermediate the positive lens and the focal plane of the lens and having dimensions greater than can be accommodated to the back focal length of the objective, and a negative lens in front of the positive lens, the power of the negative lens being less than that of the positive lens and its spacing from the objective lens being greater than the focal length of the positive lens, so as to decrease the equivalent focal length of the system without correspondingly decreasing the back focal length, and the divided light paths in the prisms being equal in length, said lens system having an equivalent focal length no greater than twice the length of the longest side of the picture aperture.

5. A photographic lens system adapted to be used with a plurality of picture apertures for producing a plurality of corrected images of the object-field, said lens system comprising a collecting lens and a dispersive lens spaced a distance at least of the order of the focal length of the collecting lens, and light-dividing prisms between the collecting lens and the image plane, the divided light paths in the prisms being equal, said lens system having an equivalent focal length no greater than twice the length of the longest side of the picture aperture.

6. A wide angle lens system adapted to be used with a picture aperture and comprising a positive lens assembly and a negative lens assembly spaced one from the other a distance greater than the focal length of the positive lens assembly and with the latter adapted to be nearer the picture aperture, said lens system having an equivalent focal length no greater than twice the length of the longest side of the picture aperture.

7. A lens system adapted to be used with a picture aperture and comprising an objective, a negative lens located in front of the objective at a distance at least of the order of the focal length of the objective, the negative lens comprising different positive and negative elements to correct for chromatic difference of focus and of magnification, one surface of the negative lens being convex and directed away from the objective and another surface of the negative lens being concave and directed toward the objective, and the power of said concave surface being at least of the order of twice the power of the convex surface, said lens system having an equivalent focal length no greater than twice the length of the longest side of the picture aperture.

8. A photographic lens system comprising an objective, light-dividing means intermediate the positive lens and the focal plane of the lens, a negative lens located in front of the objective at a distance at least of the order of the focal length of the objective, the negative lens comprising different positive and negative elements to correct for chromatic difference of focus and of magnification, one surface of the negative lens being convex and directed away from the objective and another surface of the negative lens being concave and directed toward the objective, and the power of said concave surface being at least of the order of twice the power of the convex surface, whereby more space is available for said light-dividing means.

9. A lens system adapted to be used with a picture aperture and comprising an objective and a negative lens spaced one from the other a distance greater than the focal length of the objective, said lens system having an equivalent focal length no greater than twice the length of the longest side of the picture aperture, one surface of the negative lens being convex and directed away from the objective and another surface of the negative lens being concave and directed toward the objective, the power of said concave surface being at least of the order of twice the power of the convex surface.

10. A wide angle lens system adapted to be used with a picture aperture and comprising a positive lens assembly and a negative lens assembly spaced one from the other a distance greater than the focal length of the positive lens assembly and with the latter adapted to be nearer the picture aperture, said lens system having an equivalent focal length no greater than twice the length of the longest side of the picture aperture, and a reflecting member for angularly deflecting the beam of light which passes through said positive and negative lens assemblies.

11. A wide angle lens system adapted to be used with a picture aperture and comprising a positive lens assembly and a negative lens assembly spaced one from the other a distance greater than the focal length of the positive lens assembly and with the latter adapted to be nearer the picture aperture, said lens system having an equivalent focal length no greater than twice the length of the longest side of the picture aperture, and a prism disposed in the path of the light beam which passes through said positive and negative lens assemblies.

12. A lens system adapted to be used with a picture aperture and comprising an objective and a negative lens spaced one from the other a distance greater than the focal length of the objective, said lens system having an equivalent focal length no greater than twice the length of the longest side of the picture aperture, the negative lens comprising different positive and negative elements to correct for chromatic difference of focus and of magnification, the negative element being positioned between the positive element and said objective.

Signed by me at Boston, Massachusetts, this 25th day of May, 1929.

JOSEPH A. BALL.